Sept. 20, 1949.　　　　A. E. LITTLE　　　　2,482,629
CAM OPERATED LOCKING MEANS FOR
CAMERA FOCUSING MECHANISMS
Filed May 9, 1946　　　　　　　　　　　　　　　　4 Sheets-Sheet 1

INVENTOR.
Alfred E. Little.
BY
Attys

Sept. 20, 1949.                A. E. LITTLE                    2,482,629
                     CAM OPERATED LOCKING MEANS FOR
                       CAMERA FOCUSING MECHANISMS
Filed May 9, 1946                                       4 Sheets-Sheet 2
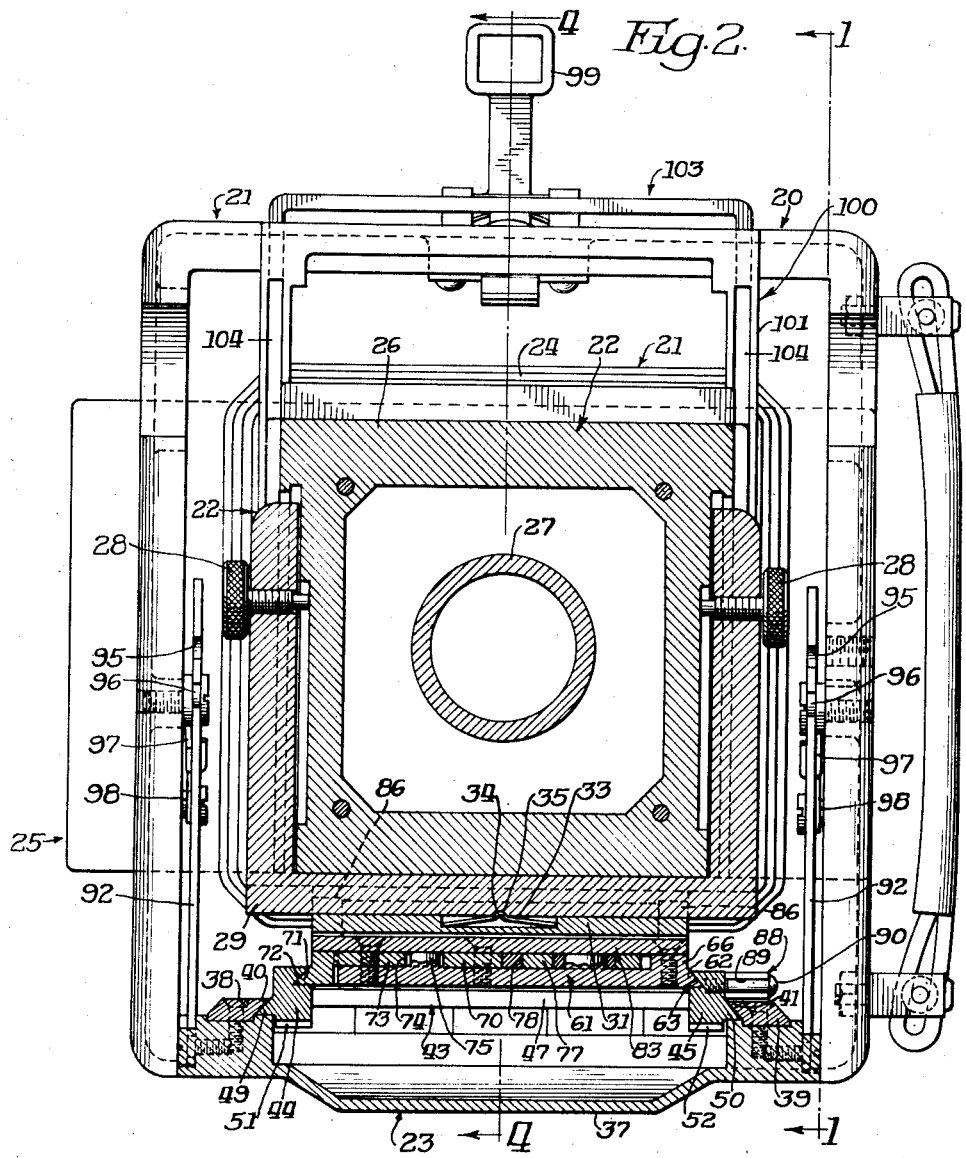
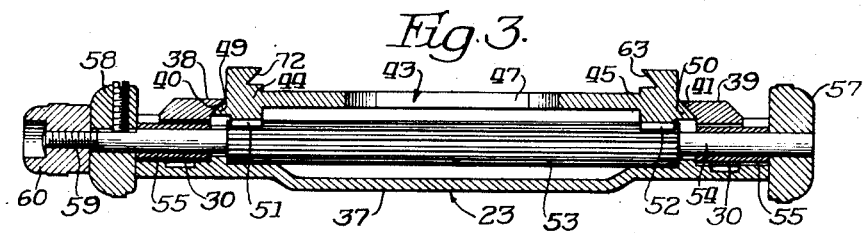
INVENTOR.
Alfred E. Little.
BY George S. Pines
                Attys

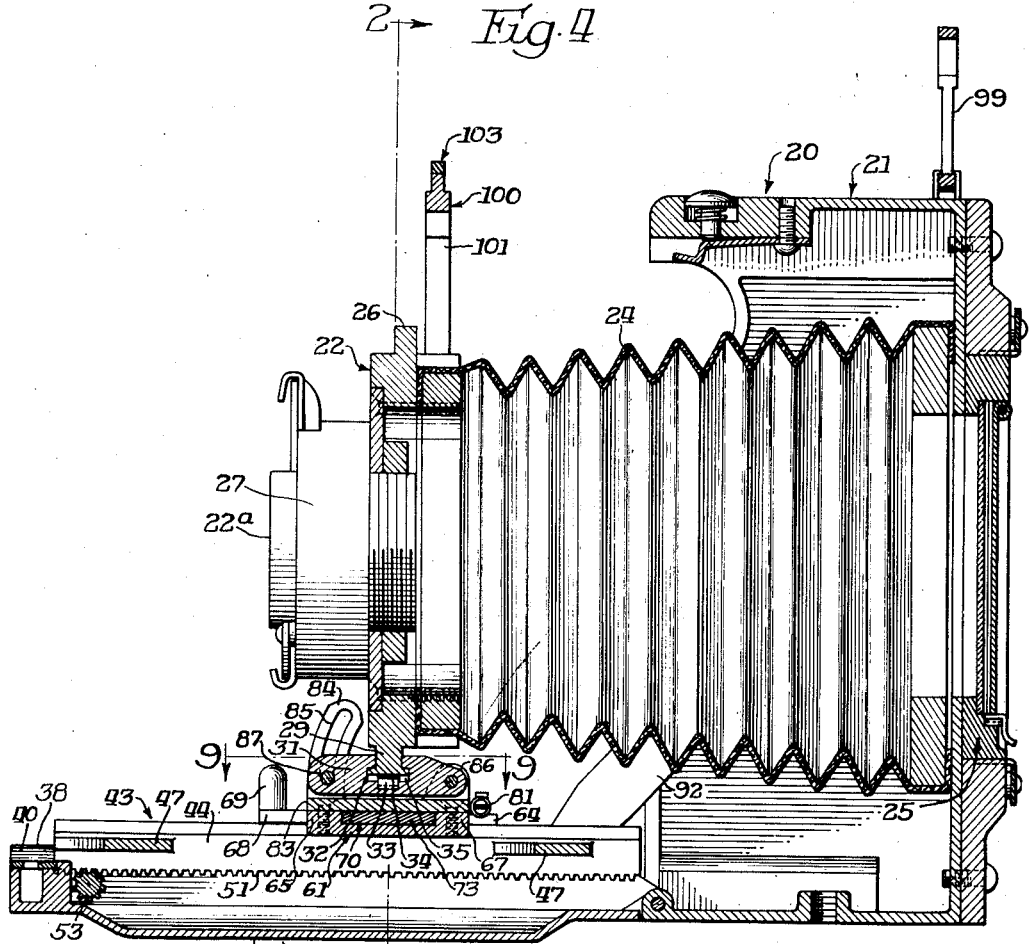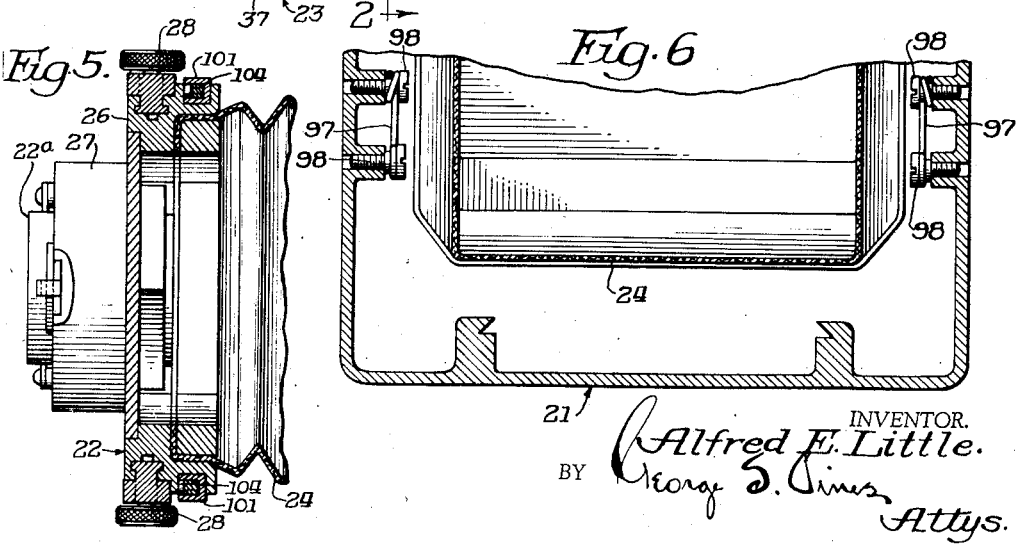

Sept. 20, 1949.    A. E. LITTLE    2,482,629
CAM OPERATED LOCKING MEANS FOR
CAMERA FOCUSING MECHANISMS
Filed May 9, 1946    4 Sheets-Sheet 4
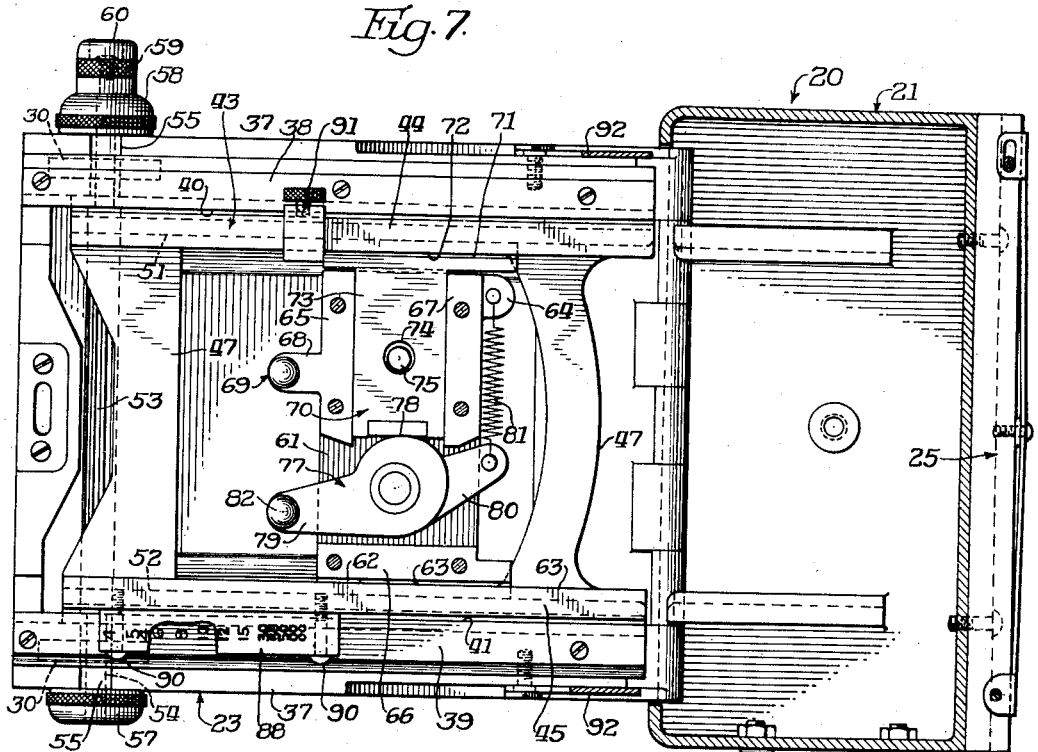
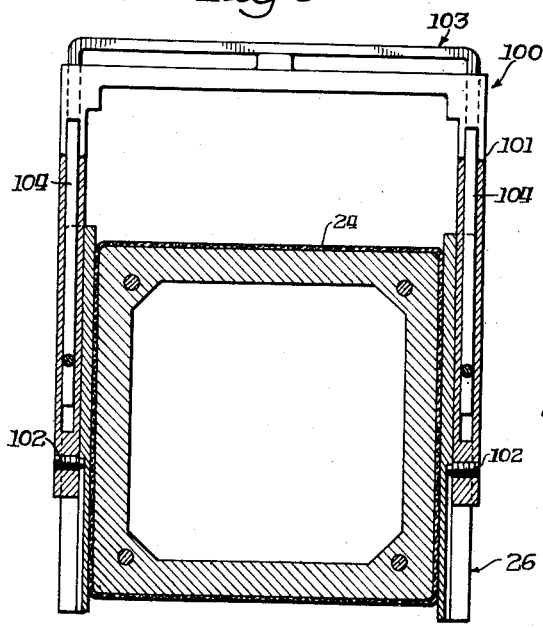
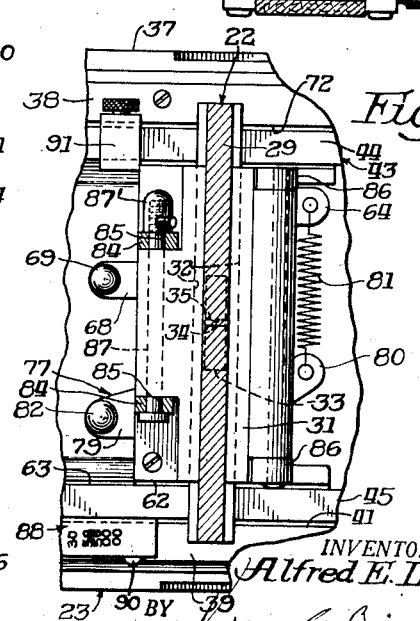
INVENTOR.
Alfred E. Little.
BY
George S. Ames
Attys.

Patented Sept. 20, 1949

2,482,629

UNITED STATES PATENT OFFICE 2,482,629

CAM OPERATED LOCKING MEANS FOR CAMERA FOCUSING MECHANISMS

Alfred E. Little, Chicago, Ill., assignor to Busch Precision Camera Corporation, Chicago, Ill., a corporation of Illinois Application May 9, 1946, Serial No. 668,577

2 Claims. (Cl. 95—46)

This invention relates to photographic apparatus and more particularly to improvements in camera constructions.

An object of this invention is the provision, in a camera, of means for locking the lens in the desired position against inadvertent displacement after focusing the camera lens.

Other and further objects of the present invention will be apparent from the following descriptions and claims and are illustrated in the accompanying drawings which, by way of illustration, show a preferred embodiment and the principle thereof and which is considered to be the best mode contemplated for applying that principle. Other embodiments of the invention embodying the same or equivalent principle may be used and structural changes may be made as desired by those skilled in the art without departing from the present invention and a purview of the appended claims.

In the drawings,

Fig. 2 is a cross sectional view taken on line 2—2 of Fig. 4.

Fig. 3 is a cross sectional view taken on line 3—3 of Fig. 1.

Fig. 4 is a cross sectional view taken on line 4—4 of Fig. 2.

Fig. 5 is a cross sectional view taken on line 5—5 of Fig. 1.

Fig. 6 is a cross sectional view taken on line 6—6 of Fig. 1.

Fig. 7 is a cross sectional view taken on line 7—7 of Fig. 1.

Fig. 8 is a cross sectional view taken on line 8—8 of Fig. 1.

Fig. 9 is a cross sectional view taken on line 9—9 of Fig. 4.

Figure 1:
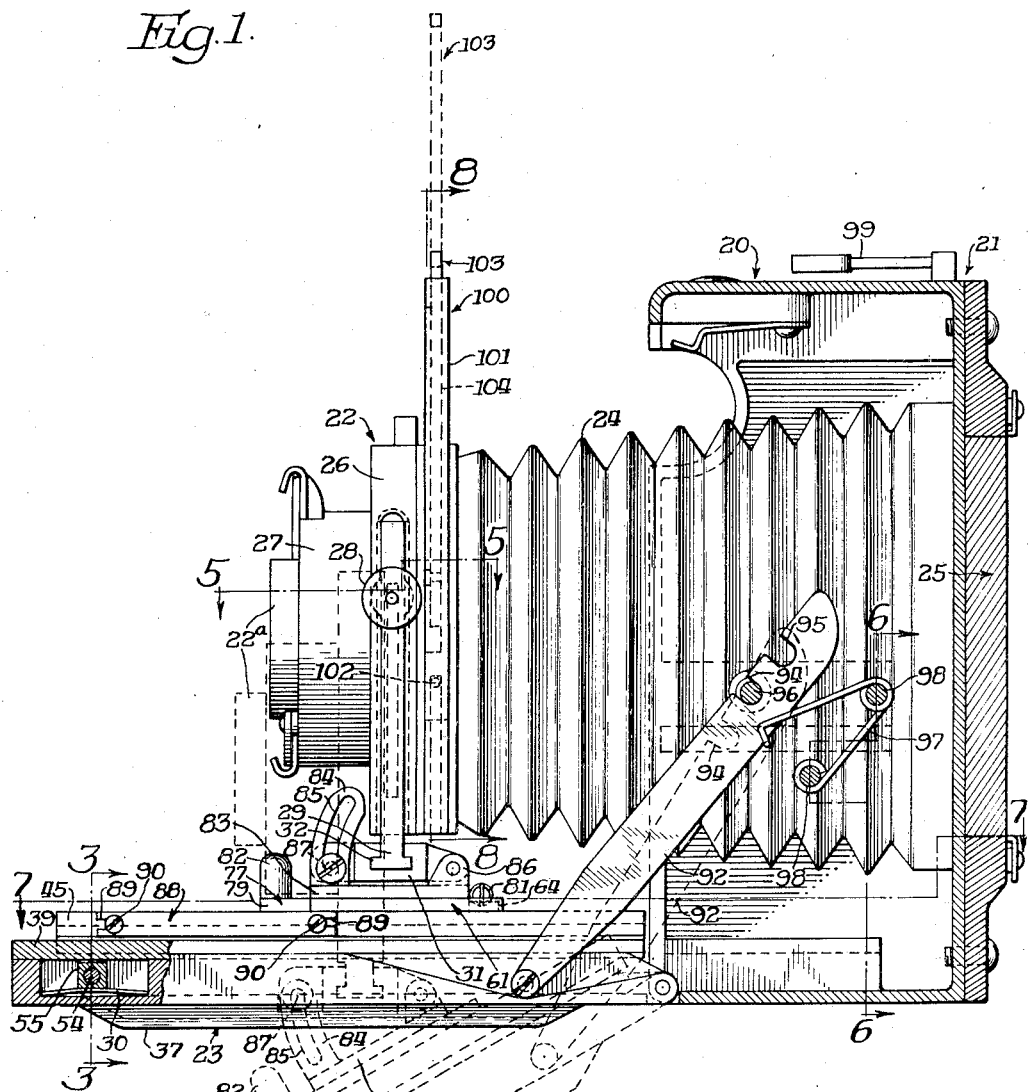
Fig. 1 is a longitudinal cross sectional view of a preferred embodiment of my invention taken on line 1—1 of Fig. 2, showing in dotted lines a position capable of being assumed by the camera bed.

Referring to the drawings, the numeral 20 designates generally a bellows type camera including a housing 21, a bellows 24, a lens 22a, a lens mount 22, a bed 23 and a focusing screen 25, the latter having associated therewith means for holding a sensitized film or plate in a well known conventional manner.

The lens mount 22 comprises a substantially U-shaped frame 26 arranged for receiving a lens 22a and shutter assembly 27 and for securing the same in position, as by set screws 28, in threaded engagement with the side members of the frame 26. The bottom member 29 of the frame 26 is shaped in cross section substantially like an inverted T and is arranged for sliding movement in a member 31 having a correspondingly shaped slot 32. A spring member 33 is disposed in a recess provided in the slot 32 and is provided with a protuberance 34 arranged to register in a notch 35 provided on the face of the bottom member 29 for holding the lens mount 22 and its related structure so that the optical axis of the lens 22 is centered relative to the focusing screen 25. The lens mount 22, however, is capable of movement laterally of the longitudinal axis of the bed 23 to permit adjustment of the optical axis of the lens for various photographic conditions.

The camera bed 23 disposed in the hinged front wall 37 of the camera housing includes a pair of longitudinally extending guide rails 38 and 39 each having inwardly inclined inner side walls 40 and 41 respectively. A frame 43 having side members 44 and 45 joined by a cross member 47 supports the locking mechanism hereinafter described. The side members 44 and 45 include outwardly inclined longitudinal sections 49 and 50 respectively, arranged to engage the inclined walls 40 and 41 of the guide rails 38 and 39 to retain the frame 43 for slidable movement relative thereto. The under sides of the side members 44 and 45 are provided with gear racks 51 and 52 respectively, which are arranged for cooperative engagement with a pinion 53, hereinafter to be described.

The pinion 53 extends substantially across the width of the frame 43 and operatively engages the gear racks 51 and 52. The pinion 53 is carried on a spindle 54, mounted for rotatable movement in journals 55. The journals 55 are disposed in recesses provided in the bed 23 and bow springs 30 resiliently support the journals 55 at their uppermost positions in the recesses, thereby retaining the pinion 53 in operative engagement with the racks 51 and 52. The spindle 54 carries on one end a knob 57 fixed thereto. The other end of the spindle has a knob 58 which is keyed thereto, but arranged for limited axial movement. The end of the spindle is tapped to receive a threaded stud 59 carrying a lock nut 60, arranged for drawing the knobs 57 and 58 against the ends of the journals 55 for locking the pinion 53 in any desired position.

The locking mechanism hereinbefore referred to includes a base member 61 having integrally formed along one side thereof, an outwardly inclined longitudinal section 62, arranged for slidable movement in a complementary longitudinal groove 63 provided in the member 45. The base member 61 is provided with a wall portion 66 having tapped holes and a perforated integral ear 64. The guide members 65 and 67 are disposed in spaced relationship and are secured to the base 61 by screws. The guide member 65 is provided with a projection 68 which carries an upright finger engaging member 69. A member 70 has an outwardly inclined section 71, arranged for longitudinal slidable movement in a complementary groove 72 provided in the member 44, and an offset body portion 73 arranged for slidable movement between the guide members 65 and 67. An aperture 74 is provided in the body portion 73 for receiving an upright pin 75 fixed to the base member 61. The pin 75 is smaller in diameter than the aperture 74 and serves as a means for limiting the lateral movement of the member 70, and also for retaining the said member against falling out of position while the camera is being assembled or disassembled.

A member 77 is pivotly mounted on the base 61 and includes a cam portion 78 and arms 79 and 80. The arm 80 is perforated to receive a spring 81 which is connected to the ear 64. The arm 79 is provided with an upright finger engageable member 82. The cam portion 78 is arranged for operative engagement with the slidable member 70. As is seen in Fig. 7, the cam portion 78 is urged by the spring 81 to move the slidable member 70 in a direction so that the section 71 is caused to bear against the walls of the groove 72, thereby frictionally locking the entire structure associated with the lens mount 27 against movement. By manipulating the member 82 to pivot the cam portion 78 in a direction against the tension of the spring 81, pressure against the walls of the groove 72 is relieved and the structure is then capable of being moved longitudinally. With the above construction, more positive locking action is effected than by the use of a spring pressure only.

A cover plate 83 is provided and is secured in position by screws. The said cover member carries upwardly spaced perforated ears 86, 86 and spaced guide members 84, 84 having arcuate slots 85.

As seen particularly in Figures 1 and 4, the member 31 is hingedly mounted to the ears 86, 86, while the opposite free ends of the member 31 carrying a threaded pin 87 and a lock nut 88 are received in the arcuate slots 85 of the guide members 84, 84. The lens mount 27 is thereby capable of being pivoted upwardly to the limit defined by the slots 85 and of being locked in any position by the lock nut 88 carried on the pin 87.

Figure 10:
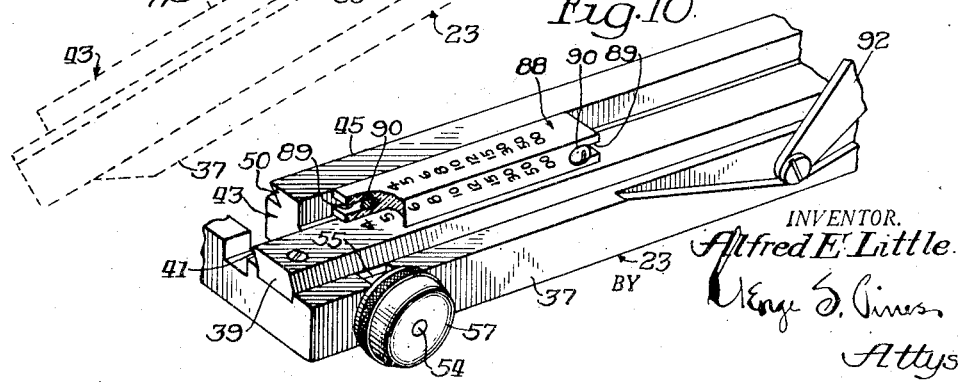
Fig. 10 is an enlarged perspective view of a detail.

The focusing scale which forms an important feature of my invention, comprises a member 88 formed preferably of transparent material and having end slots 89, 89 to receive screws 90 which secure the member 88 to the member 45. As is seen in Fig. 10, the slots 89, 89 are elongated to permit relatively wide latitude in adjustment of the position of the member 88 relative to the member 45 when the member 88 is assembled on the member 45 and adjusted to coordinate with the camera lens. The member 88 carries a series of numerals or other suitable markings or indicia either engraved or embossed thereon. Each numeral or mark represents a particular distance corresponding to that which the object or subject to be photographed is positioned from the camera lens. The guide member 39 similarly carries a series of numerals or markings representing distances, the latter numerals or indicia being arranged so that the former may be selectively super-imposed over the latter. The said two series of numerals or markings are arranged relative to each other, so that only corresponding numerals of each series may be in alinement at any particular time. The scale is calibrated relative to the actual distance the object or subject to be photographed is positioned from the lens so that when corresponding numerals of each of the separate series of numerals are brought into registering alinement by turning the knobs 57 and 58 to move the gear racks 51 and 52, as previously explained, the lens is in exact focusing position for that particular distance. For example, if the object or subject to be photographed is located 10 feet from the lens, the operator manipulates the knobs 51 and 52 to move the lens mount 22 and correspondingly the member 88 to super-impose the numeral 10 of the member 88 directly upon the numeral 10 carried on the guide member 39. At this position, the lens is in perfect focus for photographing the object located at a distance of 10 feet from the lens.

A stop 91, provided with a set screw is mounted on the guide member 44 in a position to limit the extension of the bellows to a point corresponding to a distance of infinity for the lens at which point the indicia on the member 88 and guide member 39 identifying the distance of infinity for the lens are in super-imposed alined relation.

Arms 92, 92 are pivotly connected to the hinged front wall 37 of the housing and each is provided at its free end with a pair of spaced slots 94 and 95 which are arranged for selective engagement with the studs 96, 96, mounted in bosses on the side walls of the camera housing. Spring members 97, mounted on studs 98, 98, carried on the walls serve to urge the arms 92, 92, in a direction to retain the same, with the studs 96, 96, received in either of the slots 94 or 95.

The studs 96, 96, are mounted on the side wall of the housing for eccentric rotation relative to their axes. They serve to support the front wall 37, when in open position, and also provide means whereby close adjustments may be made to properly position the bed of the camera relative to the plane of the focusing screen.

As is illustrated in Fig. 1, if conditions require, the bed may be swung downwardly to the extreme lowermost position, as is shown in the dotted lines. In this position, the slots 95, 95, of the arms 92, 92, are engaged with the studs 96, 96, and the pin 87 of the member 31 bears against the ends of the arcuate slots 85, 85, in the guide members 84, 84. It will be understood that the lens mount may be pivoted relative to the plane of the bed and locked in any intermediate position within the range of the arcuate slots.

An eye piece 99 is pivotly mounted on the housing and is arranged to be swung to non-operative position as shown in Fig. 1, and to operative position, as shown in Figures 2 and 4. The eye piece 99 is intended to be used in conjunction with a view framer 100 which comprises an inverted substantially U shaped channel member 101 mounted for telescopic movement in recesses provided in the side members of the frame 26. Set screws 102 are provided to engage shoulders on the side members of the frame 26 to limit the upward movement of the member 101. An inverted substantially U shaped member 103 is arranged with the legs 104, 104, thereof received in the legs of the channel member 101 for slidable movement therein. The end portions of the legs 104, 104, are bent at right angles to provide stops to limit the upward movement of the member 103. In use, the member 101 is moved upwardly to the limit of its position, as shown in Figures 1 and 2, the member 103 being shown in its retracted position in Fig. 2. Thereafter the member 103 is drawn upwardly to the position shown in Fig. 1, in dotted lines.

It is to be understood that the form of my invention, herewith shown and described, is to be taken as a preferred example of the same, and that various changes in the shape, size and arrangement of parts may be resorted to, without departing from the spirit of my invention, or the scope of the appended claims.

I claim:

1. In a camera construction of the character described and having a bed including a pair of spaced guide members, a frame on said bed slidable along said guide members, guide ways on said frame, a lens and lens mount, the herein invention which comprises a base member carrying said lens mount, said base member being slidable in the guide ways, a braking member mounted on the base member and being slidable along said guideways, a disc-like flat cam pivotally mounted for rotation in a plane parallel to said bed and engaging one end of said braking member, the braking member being slidable in substantially the plane of said cam and having a second end thereof opposite said engaged end juxtaposed in braking relationship with one of said spaced guide members, and biasing means applying a torque to said cam tending to cause same to move the braking member to engage said last mentioned guide member and bind said base member against sliding movement.

2. In a camera construction of the character described and having a bed including a pair of spaced guide members, a frame on said bed slidable along said guide members, guide ways on said frame, a lens and lens mount, the herein invention which comprises a base member carrying said lens mount, said base members being slidable in the guide ways, a braking member mounted on the base member and being slidable along said guideways, a disc-like flat cam pivotally mounted for rotation in a plane parallel to said bed and engaging one end of said braking member, the braking member being slidable in substantially the plane of said cam and having a second end thereof opposite said engaged end juxtaposed in braking relationship with one of said spaced guide members, and biasing means applying a torque to said cam tending to cause same to move the braking member to engage said last mentioned guide member and bind said base member against sliding movement, and means for manually rotating the cam against the torque of said biasing means to relieve said binding and permit sliding movement of said base member.

ALFRED E. LITTLE.

REFERENCES CITED

The following references are of record in the file of this patent:

UNITED STATES PATENTS

| Number | Name | Date |
|---|---|---|
| 558,039 | Carlton et al. | Apr. 14, 1896 |
| 668,090 | Bullard | Feb. 12, 1901 |
| 720,040 | Locke | Feb. 10, 1903 |
| 770,219 | Case | Sept. 13, 1904 |
| 1,042,023 | Miller | Oct. 22, 1912 |
| 1,142,904 | Morrell | June 15, 1915 |
| 1,176,399 | Needham | Mar. 21, 1916 |
| 1,196,209 | Clark et al. | Aug. 29, 1916 |
| 1,210,534 | Riddell | Jan. 2, 1917 |
| 1,274,561 | Krodel | Aug. 6, 1918 |
| 1,883,797 | King | Oct. 18, 1932 |
| 2,264,777 | Steiner | Dec. 2, 1941 |
| 2,293,598 | Drucker | Aug. 18, 1942 |
| 2,397,573 | Wilcox | Apr. 2, 1946 |